United States Patent [19]
Semeraro

[11] Patent Number: 5,338,176
[45] Date of Patent: Aug. 16, 1994

[54] PIE CRUST LIFTER

[76] Inventor: Michael A. Semeraro, P.O. Box 1814 Butterfield Station, Utica, N.Y. 13503

[21] Appl. No.: 73,046

[22] Filed: Jun. 8, 1993

[51] Int. Cl.$^5$ .............................. A21C 3/02; A21C 9/00
[52] U.S. Cl. ...................... 425/374; 249/66.1; 249/67; 249/74; 425/436 R; 425/436 RM; 425/444
[58] Field of Search ............ 249/67, 68, 74, 76, 249/136, 66.1, DIG. 4; 425/374, 444, 436 R, 436 RM; 426/502, 512, 517

[56] References Cited

U.S. PATENT DOCUMENTS

| | | | |
|---|---|---|---|
| 2,013,879 | 9/1935 | Dillenbach | 249/66.1 |
| 2,293,287 | 8/1942 | Franz | 425/436 RM |
| 2,297,914 | 10/1942 | Pino | 249/136 |
| 4,009,857 | 3/1977 | Delmas | 425/374 |
| 4,522,580 | 6/1985 | Poister | 425/374 |
| 4,741,197 | 5/1988 | Spuhler et al. | 249/67 |
| 4,808,104 | 2/1989 | D'Orlando | 426/512 |

Primary Examiner—Khanh P. Nguyen
Attorney, Agent, or Firm—John P. Halvonik

[57] ABSTRACT

The invention is a pie crust lifting tool and corresponding rolling board for lifting pie crusts from a rolling board and placing them in a pie plate in anticipation of baking. The lifting tool has a handle at one end and a circular shaped portion known as the lifting ring at the other end. The rolling board is used in conjunction with the tool and has a specially shaped groove in the upper surface in order to accommodate the tool when the crust is being rolled. The groove is circular in shape and has a straight channel connecting the circular shape with one edge of the board. The tool rests in the board until one is ready to use the board. Pie crust or other dough is rolled on the board and then lifted off of the board by use of the lifting tool. The dough is then transported to a pie plate or pie dish or other baking utensil.

4 Claims, 1 Drawing Sheet

PIE CRUST LIFTER

FIELD OF INVENTION

1. Background of the Invention

The invention relates to the field of culinary tools and in particular to a two piece apparatus for the rolling and subsequent lifting of doughs such as pie crusts. The device comprises a rolling board with a semi circular groove along the top surface and the lifting tool which has a handle and a circular portion at the end of the handle which fits inside the groove. Pie crusts and other doughs may be rolled on the board and then lifted off the board by using the lifting tool which is lying beneath the dough as it is being shaped.

2. Description of the Prior Art

While there are flat rolling boards and pronged tools for lifting plates, etc. there are no apparatus that applicant is aware of that describe a rolling board with semi circular groove and a corresponding lifting device with a handle and a circular prong that fits in the groove.

SUMMARY OF THE INVENTION

The pie crust lifter to be herein described is of two-part construction. The first part comprises the rolling board or pastry board that is of generally rectangular or square construction and having specially shaped Groove or channel in the upper surface. The other part is the lifting tool which has a handle at one end and a circular shaped portion at the other end. The circular portion is open in the middle i.e. it is a ring shape.

The groove in the board corresponds to the shape of the lifting tool in order for the tool to rest within the groove and underneath the crust or dough as the latter is being worked. The groove has a circular part to correspond to the circular portion of the tool and a straight channel portion that connects the circular part with one edge of the board. When the user is ready to transfer the rolled dough from the board to the pie plate for baking the tool is lifted by the handle and the crust of course comes along being on top of the circular lifting tool.

It is an object of the invention to provide a means for lifting pie crusts and other doughs off of a rolling board and placing such onto a baking apparatus, without damaging crusts or doughs.

Yet another objective is to provide a rolling board for pie crusts that will allow one to judge the size of the pie crust being shaped by reference to the board, and ring.

Other objectives of the invention will become apparent to those skilled in the art once the the invention has been shown and described.

DESCRIPTION OF THE PREFERRED EMBODIMENT

Figure 1:
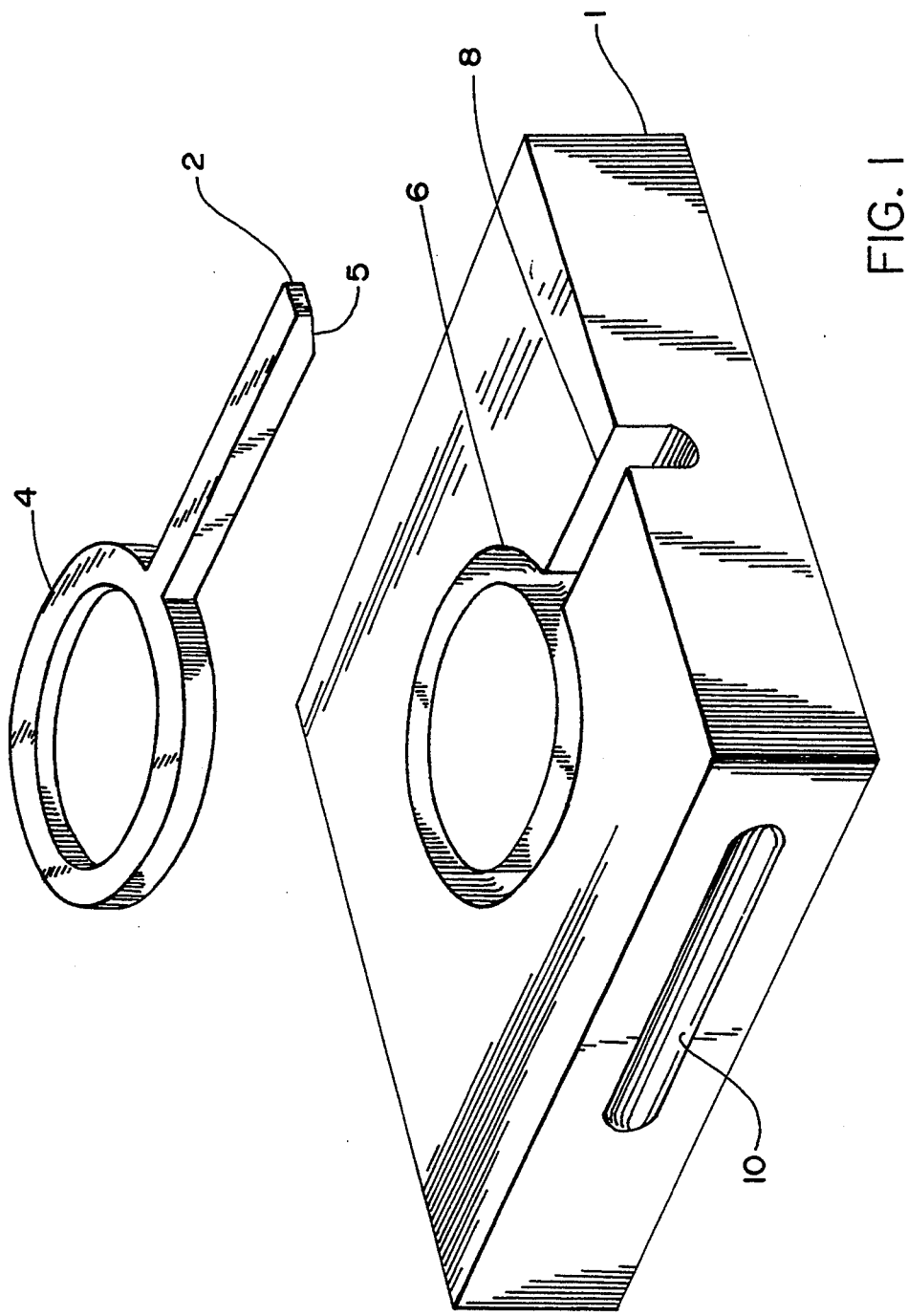
FIG. 1 Overall view of lifting tool and rolling board.
Figure 2:
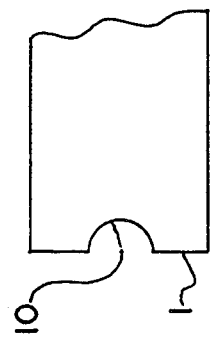
FIG. 2 Cross section of hand hold.

The overall construction of the two part apparatus is as shown in FIG. 1. The board 1 is of ordinary construction with the exception of the specially shaped groove that has been cut in it. The board may be of wood, plastic or other materials that would find use as a support for the rolling of doughs. In its preferred construction the board would be of maple wood and measure about 23″ by 23″. The thickness of the board should be about 1½″.

The lifting tool has a handle 2 at one end and a circular shaped portion 4 at the other end. It is preferred that this portion be circular in shape and be open i.e. a ring. The bottom of the end of the handle may have a removed portion as shown by numeral 5 so that a space remains between the handle and the bottom of the straight channel. This is in order to allow the user to lift the handle from the channel for gripping.

The rolling board has a specially shaped channel that is meant to correspond to the shape of the lifting tool in order for the tool to rest within the channel and underneath the crust or dough as the latter is being worked. The channel has a circular portion 6 to correspond to the circular portion of the lifting tool and a straight channel portion 8 that connects the circular part with one edge of the board. The handle rests in this straight portion. This channel is of open construction, that is it is in connection with the top surface of the board so as to allow the handle to be placed in the channel.

As a variation, a second handle may be added on the side of the ring 4 opposite the first handle. This second handle is to aid in transporting the crust. In this case, the board would have a second straight channel in the upper surface opposite the first such straight channel.

It is preferred that the handle be made of birch plywood but, of course, other materials are possible without violating the spirit of the invention. It is preferred that the handle and the ring be about ¾″ in diameter.

The circular-shaped portion 4 or ring may be of special shape. The upper surface of the ring should be flat in order to be flush with the top surface of the board. The under surface of the ring should be of rounded, or half moon shape as seen in cross section. In this case the circular groove 6 would have a corresponding rounded portion in the bottom in order to correspond to the tool. The shape on the underside of the ring and handle could also be beveled at a 45° rout on either side. In this case, the channel 6, 8 would have a corresponding shape in the bottom in order to accommodate the tool.

To use the tool and board, the tool is first laid flat in the channel 6, 8 so that it lays flush with the top surface of the board. The board should then be laid atop a non skid surface such as a mat in order to keep it in place. The pie crust or other dough material is then laid on top of the board and the user commences working the dough with rolling pin etc. The user should keep the dough centered within the ring so that it will be easier to lift the dough off later. As with any board, flour may be added to prevent sticking of the dough When the pie crust is ready for baking the user may gain access to the handle by placing a finger in the space between the handle and the bottom of the straight channel. The user then lifts the dough off of the board by grasping the handle. The handle enables one to lift the dough without having to reach along the sides of the dough and risk tearing it. The tool with dough is then placed over the pie plate or other baking surface and the dough is delivered to the pie plate for baking.

As an option, an aperture 10 may be used as a hand hold in order to help lift the board. A second aperture should also be used on that side of the board opposite this aperture.

Of course the board and lifting tool may find utility with a great many varieties of foodstuffs. Pie crusts, pizza crusts, and other dough products that need to be worked before baking may find use on the board.

The lifting tool may be made in different sizes in order to for the user to choose a certain size for a certain size pie that he or she wants to make. Typical sizes would be e.g. 8", 9" or 10" diameters for the circular portion of the tool. Different size lifting tools will have a separate corresponding board.

I claim:

1. A two part pie crust rolling and lifting apparatus comprising: a first part rolling board, said board having a top surface and a bottom surface and side edges, said board having a circular shaped channel within said top surface and a straight channel in connection with said circular channel, said straight channel in connection with one of said edges and a second part lifting member comprising a circular shaped portion and a straight handle in connection with said circular portion wherein said lifting member is of size adapted to fit in said channels so that said lifting member is used to transport dough after it has been rolled on said rolling board.

2. The apparatus of claim 1 wherein said circular portion is of size adapted to fit in said channel so that said circular portion is flush with said top surface of said rolling board.

3. The apparatus of claim 2 wherein said handle is of beveled construction so that a space remains between said handle and said straight channel in order to allow one to lift said handle.

4. The apparatus of claim 3 wherein said board has an aperture in one of said sides, to enable one to transport said board.

* * * * *